United States Patent
Kauder

[15] 3,643,702
[45] Feb. 22, 1972

[54] FLEXIBLE PIPE SYSTEM
[72] Inventor: Knut Kauder, Hannover, Germany
[73] Assignee: Kabel- und Metallwerke Gutehoffnungshutte Aktiengesellschaft, Hannover, Germany
[22] Filed: Oct. 16, 1969
[21] Appl. No.: 866,843

[52] U.S. Cl. .............................. 138/121, 138/173, 138/178, 138/114, 138/122
[51] Int. Cl. ...................................................... F16l 11/12
[58] Field of Search ................ 138/121, 122, 173, 178, 113, 138/114

[56] References Cited

UNITED STATES PATENTS

| | | | |
|---|---|---|---|
| 2,740,427 | 4/1956 | Swan | 138/122 |
| 2,865,403 | 12/1958 | Le Vantine | 138/121 |
| 3,058,861 | 10/1962 | Rutter | 138/121 |

FOREIGN PATENTS OR APPLICATIONS

| | | | |
|---|---|---|---|
| 1,188 | 1901 | Great Britain | 138/173 |
| 11,017 | 1884 | Great Britain | 139/173 |
| 8,318 | 1888 | Great Britain | 138/173 |
| 96,031 | 8/1963 | Denmark | 138/121 |
| 721,398 | 6/1942 | Germany | 138/121 |
| 468,583 | 3/1969 | Switzerland | 138/121 |

Primary Examiner—Herbert F. Ross
Attorney—Smyth, Roston & Pavitt

[57] ABSTRACT

A pipe system is disclosed which includes a corrugated pipe for conduction of fluid, the corrugation defining an asymmetrical wave pattern in an axial plane, to establish a periodically recurring sequence of flow zones of gradually increasing cross section, alternating with nozzles.

7 Claims, 1 Drawing Figure

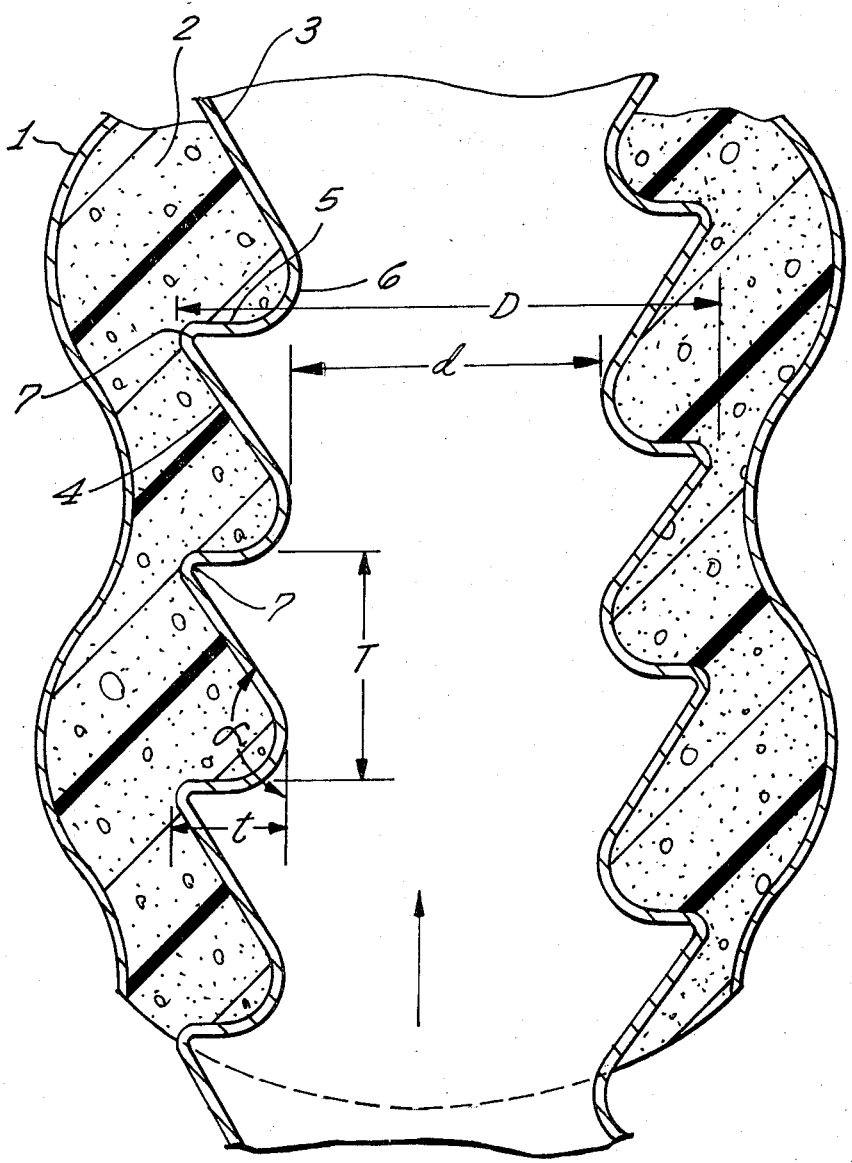

FLEXIBLE PIPE SYSTEM

The present invention relates to flexible pipes and pipe systems. It is known per se to use flexible pipes particularly for the conduction of liquids or gases. Such pipes are made flexible particularly to facilitate their own transportation and installation. In particular, pipes are made flexible in that they are provided with helical or circular, bellowslike corrugations. However, corrugated pipes inherently provide larger flow losses (speed loss for the fluid) than pipes with smooth walls. In order to keep such losses low, the wave amplitudes of the wall as established by the corrugation has been selected to be rather small. But, of course, flexibility of a pipe with little corrugation is likewise reduced and this in turn limits utilization of such pipes particularly when flexibility is an important factor.

It is an object of the present invention to provide an economically justifiable, corrugated pipe which, as far as its mechanical properties are concerned, meets the requirements to the optimum and which does not excessively deteriorate fluid-dynamic performance as compared with a smooth pipe, without however attempting to provide identical hydraulic and fluid dynamical conditions.

It is therefore a particular object of the present invention to provide a flexible pipe for the conduction of fluid which is flexible to the extent required but which establishes fluid-dynamic conditions which are improved over the corrugated pipe heretofore used. The pipes as particularly improved by the present invention are corrugated so that the wall of the pipe when traversing an axial plane defines a wave pattern in direction of flow along the pipe's axis.

In accordance with the present invention, it is suggested to provide the corrugations as an asymmetrical wave pattern whereby particularly, and looking in the direction of the intended flow, the front or leading flank of a wave is rather flat and has a small angle corresponding to a rather gradual widening of the flow path in the vicinity of that wall portion; and the rear flank of that wave is almost or completely rectangularly arranged to the direction of flow, corresponding to a rather abrupt flow path constriction. A pipe having such asymmetrically corrugated wall still is highly flexible, but on the other hand, the fluid dynamic conditions established therein are actually not much different from those of an uncorrugated, smooth type pipe.

For a corrugated pipe one can define an "equivalent inside diameter" to be that inside diameter of an uncorrugated pipe having the same flow losses as the corrugated pipe under consideration. Using this terminology, it was found that the actual inside diameter and the equivalent inside diameter of a pipe corrugated under observation of the rules in accordance with the present invention are not significantly different. It was thus found that the flexible pipe in accordance with the invention meets the requirements as far as mechanical properties as well as flow dynamics is concerned.

The wave valleys or corrugation grooves of such a pipe establishes flow path constructions recurring on a periodic basis along the direction of flow. These constrictions can be regarded as a sequence of nozzle or orifices particularly for flow of fluid in the range of $10^4$ to $10^5$ Reynolds numbers. Numerous tests have established that a pipe with such an asymmetric corrugation and wave pattern establishes minimum of flow losses, particularly where, looking in the direction of flow, the front wave flank of a wave of the pattern has inclinations which is rather flat and in which the rear flank is at right angles or almost at right angles to the flow axis. This is, of course, particularly true when compared with heretofore used symmetric wave pattern.

Considering the flow dynamics, the following observations have been made. The widening of the flow path in direction of flow is to occur at a rather shallow angle, as the area of flow path widening was defined as one pertaining to a leading wave flank. Thus, rather gradual widening corresponding to a small angle to the flow axis is less abrupt than in case of conventional corrugation. It is for this reason that the flow separates later, i.e., at a point of the tube's wall for a larger inside diameter. Accordingly, the stagnation point at the rear flank is likewise displaced radially outwardly, or more inwardly as to the corrugation pocket so that there is a relative hydraulic diminishing of the size of the flow zone which is disturbed by the corrugation. Thus, the disturbed flow zone measured from the point of separation to the stagnation point is considerably smaller in comparison with the regularly formed wave pattern if the flanks of the corrugation pattern waves are changed in accordance with the invention. The stagnation point is oriented at right angles to the direction of flow. The shallower angle of the leading flank of wave causes an enlargement of the regular flow area so that the chamber in which an eddy is formed becomes smaller so that smaller eddies are formed accordingly. Thus, the principal, central or axial flow is less disturbed. Also, the central flow provides less energy for formation and sustenance of these smaller eddies when compared with a symmetrical corrugation.

In accordance with a further improvement of the invention, wave depth and wavelength of the asymmetric wave pattern correspond to a symmetric wave pattern of the corrugation. Wave depth or amplitude is defined as half of the difference between maximum and minimum inside diameter of the tube, minus twice the wall thickness of the tube. Wavelength is, for example, the distance between the two wave crests (corrugation ridges) measured in the direction of flow along the tube's axis. It was found to be of advantage, if the ratio of wave depth to half of the wavelength has value in between 0.4 and 1.3, but preferably has a value of unity. Tests have actually shown that flow losses are at minimum if the dimensions are chosen to satisfy this rule.

A pipe provided with such corrugation is characterized by a particular stable formation of eddies. This in turn is instrumental in establishing minimum flow resistance for the central flow core as established in accordance with the inside diameter of the pipe. In particular, a pipe with an inner contour in accordance with the invention establishes eddies having very stable toroidal configuration. In accordance with another feature of the invention, the radius of curvature of the corrugation valleys establishing the flow path constriction should be larger than the radius of curvature of the wave crests. It was found that this way the pipe establishes a series of nozzles rather than aperture stops or orifices, as nozzles have lower losses than orifices.

In case liquids are to be conducted through the pipes which are either hotter or cooler than the environment, it may be of advantage to provide thermal insulation around the pipe. This insulation may be established, for example, by glass wool, or minerals such as perlite. Still alternatively a layer of foamed plastic can be used for thermally insulating the pipe against the exterior. In order to protect the thermally insulating layer against mechanical and/or thermal damages from the outside, the insulation layer is preferably surrounded by another corrugated lining such as another corrugated pipe of larger diameter. The wave pattern of the corrugation of the outer pipe normally does not have to meet any particular flow requirements. The corrugations of the outer pipe are thus merely provided to avoid deterioration of the flexibility of the entire pipe system. Thus, flexibility of the outer pipe is the principal factor as to its mechanical properties.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows a cross-sectional view of an example of the preferred embodiment of the present invention. It should be emphasized, however, that the illustration is schematic in nature and the wave pattern illustrated is actually overemphasized as compared with the overall diameter of the illustrated pipes themselves.

The pipe system shown in the FIGURE includes an outer corrugated pipe 1 and an inner pipe 3, the latter pipe being provided for conducting a fluid, the former serving as cover and protection. The space between pipes 1 and 3 is filled with a thermally insulating layer 2. The arrow in the figure denotes the direction of flow in inner pipe 3.

Looking in the direction of flow, the asymmetric corrugation of pipe 3 has the following configuration. The FIGURE illustrates a section through an axial plane particularly as far as the axis of the fluid conducting pipe 3 is concerned. The section of pipe 3 in this plane is a wave pattern the waves thereof having crests 7 and valleys 6. An individual wave can be regarded as having a leading flank 4 and a trailing flank 5.

The front or leading flank 4 has a divergent angle $\alpha$ measured in effect in relation to a direction which is parallel to the axis of the pipe. That angle $\alpha$ is now considerably larger than 90°. The rear or trailing flank 5 of each wave so considered, however, extends at right angles to the direction of flow. That angle does not have to be exactly 90° but it should be at least close to 90°.

As can be seen, the wave pattern is highly asymmetrical; asymmetry to be understood in relation to any crest or any valley of a wave in an axial plane. The outer pipe 1 is shown to be provided with a symmetrical corrugation pattern, and this illustration facilitates evaluation of the relationships. One can see that the leading flank 4 of each such wave extends longer in axial direction then trailing flank 5, so that the leading flank of the asymmetrical wave is relatively longer than a leading flank of a symmetrical wave of the same wavelength. The leading flank is a flow region where the cross section through the flow path widens. Thus, due to the more gradual cross section increase, separation of flow from the wall occurs later when measured from a valley which defines a flow path region of maximum construction. In other words, separation of flow occurs at a larger inner pipe diameter than in case of a symmetrical wave and corrugation pattern. Accordingly, the zone of disturbance as measured from the point of separation to the stagnation or ram point, is considerably smaller. If the contour of the flanks of the waves are selected as illustrated and differing from the symmetrical wave pattern of the corrugation accordingly.

Adjacent crests 7 there are established chambers in which eddies are formed. As the separation of the regular flow from the wall is closer to the crests 7, the chambers and eddies therein are smaller than when compared with the symmetrical wave pattern. Smaller eddies, however, take less energy from the main flow and disturb the main flow less than larger eddies so that the smaller eddies produce smaller overall losses.

As can be seen further from the drawing, the respective radius of curvature of valleys 6 is considerably larger than the radius of curvature of a crest 7. This in turn establishes a sequence of nozzles which establish less losses than orifices. As was mentioned briefly above, the wave pattern measured in the direction of flow can also be defined by a wave length T measured, for example, from peak to peak in the direction of flow. Further, $t$ can be regarded as the amplitude of the wave pattern of the depth of the waves. Amplitude $t$ can also be defined as outer diameter D of the corrugated pipe minus smallest inside diameter $d$ minus twice the wall thickness. It was found to be of particular advantage if $2t/T=1$, or at least within the range from 0.4 to 1.3

The invention is not limited to the embodiments described above but all changes and modifications thereof not constituting departures from the spirit and scope of the invention are intended to be included.

I claim:

1. A flexible pipe for conduction of fluid and having a corrugated inner wall, the corrugations defining a wave pattern in any axial direction, the corrugations having a contour and the pipe being installed in relation to direction of fluid flow therein so that the corrugations have a divergent flat leading flank with a gradual widening of the cross section of the flow path in direction of fluid flow, followed by a trailing flank defining a rapid flow path constriction, the trailing flank being defined by a wall portion of the corrugated wall extending at least substantially at right angles to the axis of the pipe and facing the flow, the corrugations of the wall having amplitude and wavelength, the ratio of amplitude to half the wavelength being within the range of 0.4 to 1.3

2. Flexible pipe as in claim 1, the corrugations, having amplitude and wave length corresponding to a symmetrical wave pattern.

3. Flexible pipe as in claim 1, the ratio being unity.

4. Flexible pipe as in claim 1, the corrugations having curved crests and valleys, the crest being where the leading flank merges into the trailing flank, the radius of curvature of the crest being considerably smaller than the radius curvature of the valley.

5. Flexible pipe as in claim 1, the pipe being clad with thermally insulating material.

6. Flexible pipe as in claim 5, the pipe as clad being covered by a protective lining.

7. Flexible pipe as in claim 6, the lining being another corrugated pipe.

* * * * *